(12) United States Patent
Ver Steegh

(10) Patent No.: US 7,789,448 B1
(45) Date of Patent: Sep. 7, 2010

(54) RETRACTABLE TARP SUPPORT SYSTEM

(76) Inventor: Wayne Ver Steegh, 1841 310th St., Oskaloosa, IA (US) 52577

( * ) Notice: Subject to any disclaimer, the term of this patent is extended or adjusted under 35 U.S.C. 154(b) by 0 days.

(21) Appl. No.: 12/427,080

(22) Filed: Apr. 21, 2009

(51) Int. Cl.
  *B60P 7/04* (2006.01)
(52) U.S. Cl. .................... 296/100.17; 296/98
(58) Field of Classification Search ............ 296/98, 296/100.17, 100.18, 104, 105, 118
  See application file for complete search history.

(56) References Cited

U.S. PATENT DOCUMENTS

| | | | |
|---|---|---|---|
| 4,915,439 A | * | 4/1990 | Cramaro ............ 296/98 |
| 5,487,584 A | | 1/1996 | Jespersen |
| 6,464,283 B2 | | 10/2002 | Haddad, Jr. |
| 6,926,337 B2 | | 8/2005 | Poyntz |
| 2005/0088007 A1 | * | 4/2005 | Royer ............ 296/100.17 |
| 2008/0116710 A1 | | 5/2008 | Smith et al. |

* cited by examiner

*Primary Examiner*—Dennis H Pedder
(74) *Attorney, Agent, or Firm*—Jason R. Sytsma; Shuttleworth & Ingersoll, PLC

(57) ABSTRACT

A retractable tarp support system for supporting a container covering is provided. The tarp support system comprises two halves and each half has a plurality of bows attached to a container that extend inwardly toward the center of the container. The bows are pivotally joined together by a crossbar extending along the end of the bars. A positioning device attached to one of the bows allows the tarp support system to move from an inwardly extended position outward to a retracted position near the sides of the container.

19 Claims, 6 Drawing Sheets

RETRACTABLE TARP SUPPORT SYSTEM

TECHNICAL FIELD

The invention relates to a tarp support system. More particularly, to a retractable tarp support system.

BACKGROUND INFORMATION

The top opening of trucks, trailers and containers are often covered by a tarp made of canvas or other material to protect the contents from the elements and prohibit the escape of material out of the container during high winds or high speed movement. In recent years, canvas-type tarp coverings for truck trailers have been rolled and unrolled across the top of the trailer with the use of a bar that runs the length of the trailer. For these types of devices, the covering material is rolled on to (or unrolled from) a cylindrical bar as the bar crawls across the top of the box.

Roll-up tarps generally require a series of bows spanning the width of the top opening of the trailer box or container. The bows and the crossbar running across the centers of the bows support the tarp material over the load contained in the trailer, facilitate movement of the roll bar, and assist placement of the covering material over the opening. However, these prior art bows hinder access to the interior of the box or container. Moreover, the items passing through the opening, such as equipment or rocks, may be relatively large or weighty, damaging the bows and crossbar if contact is made. Even regular exposure to small items, such as grain particles, will cause excessive abrasion of the bows and crossbar by extended contact over time. Hence, in the past, obtaining the advantages of using supporting bows and a crossbar to span the top width of an opening of a trailer box or container has meant that a frame-like obstruction would be present in the opening during loading and unloading of material into the box.

Jespersen, U.S. Pat. No. 5,487,584 attempted to solve this problem by providing a support for a removable covering which can be moved at least partially out of the opening when the covering is removed. However, the support in Jespersen swung outwardly from the trailer's enclosure. When the support members are hanging freely off the side of the trailer the poles are susceptible to bending and eventually become irreplaceably damaged. Further, if the driver wants to pull the trailer without having the trailer's cavity obstructed by the support members, the driver would have to remove the whole system of support members. Accordingly, there is a need for an improved retractable tarp support system.

SUMMARY

In accordance with one aspect of the present invention, a retractable tarp support system having a plurality of bows attached to a container the bows extend inwardly toward the center of the container. The bows of each half are pivotally joined together by a crossbar extending along the end of the bars. A positioning device attached to one of the bows allows the tarp support system to move from an extended position to a retracted position aligned with the inside wall of the container.

In some embodiments the positioning device may be a hydraulic or pneumatic cylinder operated remotely by a switch. The operator can automatically position the tarp support system in the extended or retracted position. Further, in some embodiments, the operator can lock the tarp support system in the extended position to prevent unintentional retraction of the tarp support system.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
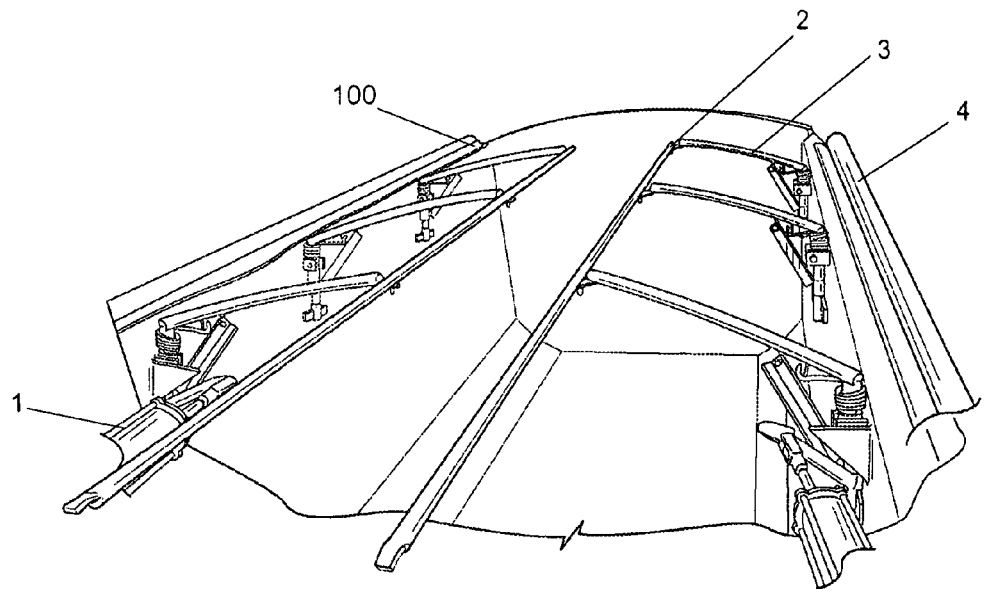
FIG. 1 is a perspective view of a portion of a container showing an embodiment of the tarp support system with the bows in the extended position.
Figure 2:
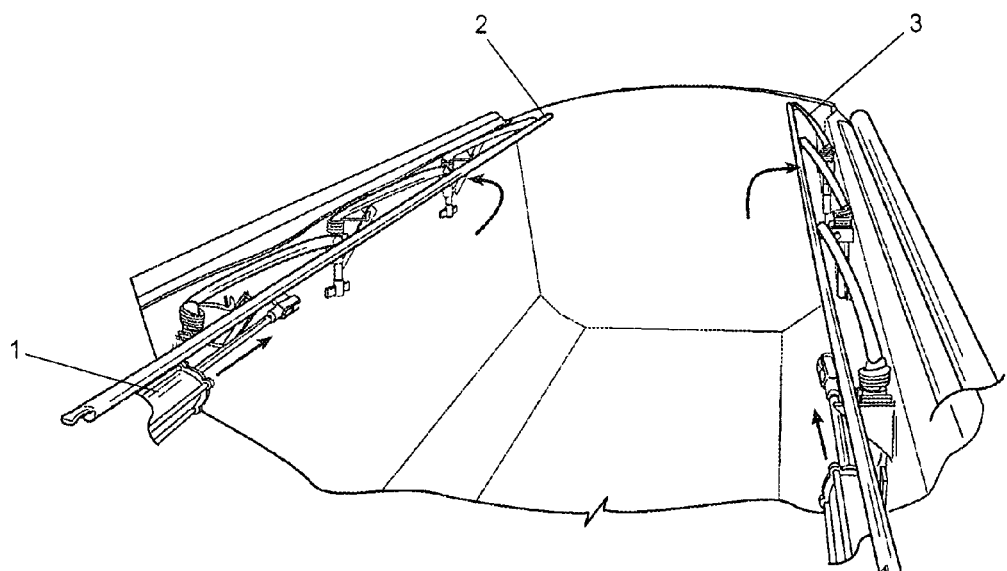
FIG. 2 illustrates the embodiment of the tarp support system of FIG. 1 with the bows in the retracted position.

FIGS. 1 and 2 generally illustrate a container 4 having a cooperating tarp support system 100. Each side of the tarp support system comprises a plurality of bows 3 joined together by a cross bar 2 and moveable by a positioning device 1. The description of the tarp support system 100 will be described in reference to one of the two generally symmetrical sides.

In the illustrated embodiment the positioning device is an actuator 1. An actuator 1 is meant to broadly include hydraulic or pneumatic cylinders, or an electric actuator 1. The operation of actuators 1 is well known by those skilled in the art and will not be described in detail.

Also, a container 4 in this application is broadly defined to include any type of container for hauling and/or holding material, such containers include, but are not limited to, an open top truck trailer, grain bin or hopper wagons, and any type of open top storage vessel stationary or mobile that is filled by discharging material into the vessel through the open top.

FIGS. 1 and 2 illustrate the two positions of the tarp support system 100. FIG. 1 shows the tarp support system 100 in the extended position. A series of bows 3 extends generally perpendicular from the inner sidewall of the container 4 toward the center. A crossbar 2 is pivotally combined near the end of the bows 3 to support the tarp (not shown) that extends over the structure 100 and join all the bows 3 together. An actuator 1 mounted near the front of the container 4 is operatively combined with a bow 3 to move the tarp support system 100 between an extended and retracted position. When the bows 3 are in the extended position, the actuator 1 holds the bows 3 extended against the force of the compressed biasing element 7, the biasing element 7 being a torsion spring 7 in the illustrated embodiment.

FIG. 2 shows the tarp support system 100 in the retracted position. The actuator 1 is extended and all the bows 3 and the cross bar 2 are generally parallel with the side of the container 4. The actuator 1 engages a bow 3 and moves all the bows 3 toward the side of the container 4. When the bows 3 are in the extended position the torsion spring 7 is compressed, such that when the actuator 1 is engaged the torsion springs 7 assist the actuator 1 in moving the bows 3 back to the retracted position. If the container 4 is filled over the height of the bows 3 with product, the force of the actuator 1 combined with the force of the torsion springs 7 can move the bows 3 through the product.

Figure 3:
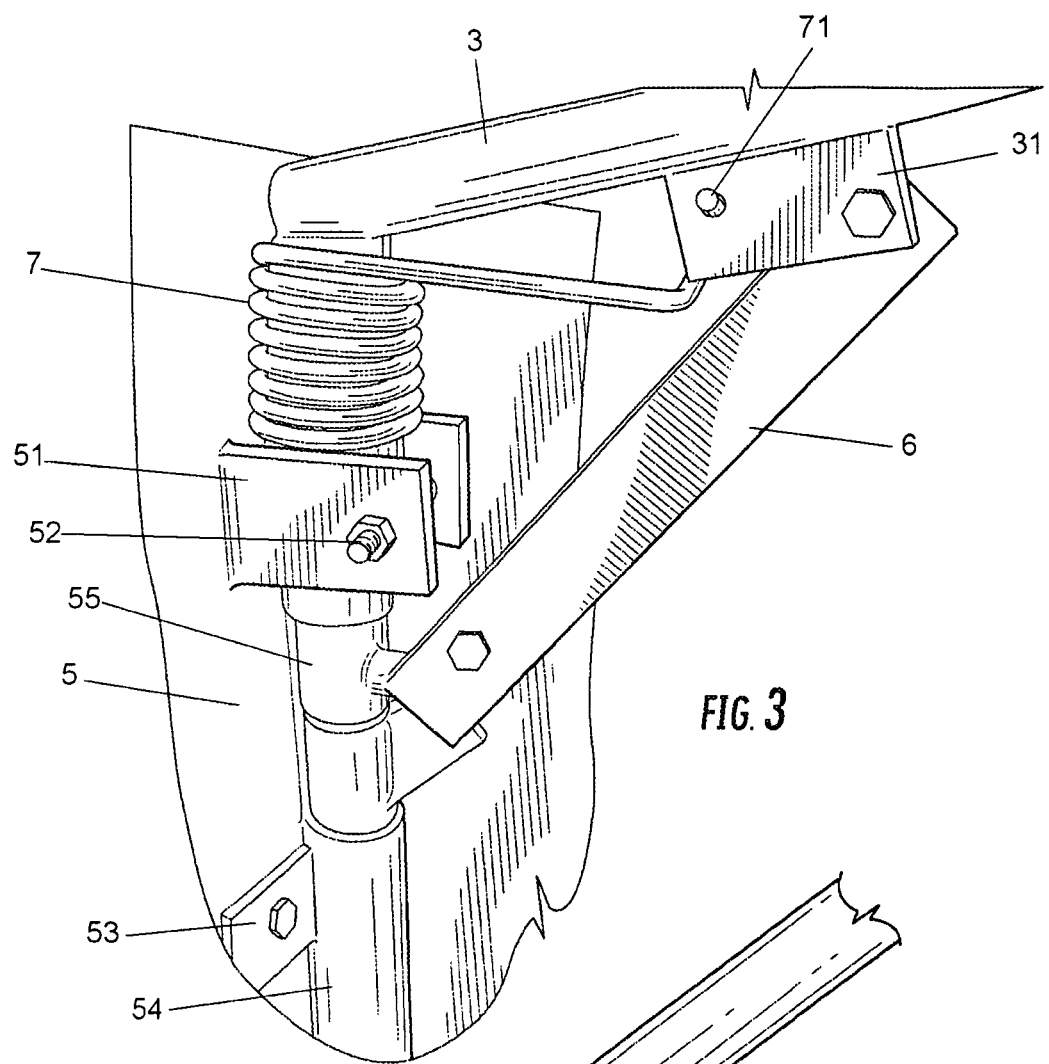
FIG. 3 is an enlarged view of the bow's hinge and a biasing element of an embodiment of the system.

Each bow 3 pivots on a hinge 5, generally illustrated in FIG. 3. The hinge 5 includes a cylindrical tube 54 that has a flange 53 welded to its side to mount the hinge 5 to the side of the container 4. A bar 55 is attached to the end of the bow 3. The bar 55 fits into the cylindrical tube 54 to form the hinge 5. The bow 3 pivots about the cylindrical tube 54.

Support elements located on or near the hinge 5 help support the weight of the bows 3. In FIG. 3, a support bar 6 combines the bow 3 and the hinge 5. The support bar 6 is attached to the bow 3 by a member 31 welded to its underside. The support bar 6 extends angularly downward to the hinge 5 and attaches at the bar 55. The hinge 5 further includes a brace 51 to hold the hinge 5 in position and provide a base for the torsion spring 7.

The torsion spring 7 sits on the brace 51 attached to the side of the container 4. The end of the torsion spring 7 combines with the bow 3 at its member 31. The torsion spring 7, in its normal position, holds the bow 3 in the retracted position. When the actuator 1 moves the bow 3 toward the sidewall of the container 4 the torsion spring 7 releases its tension. When the actuator 1 retracts, the torsion spring 7 compresses.

Alternatively, an embodiment has the torsion spring 7 hold the bow 3 extended in its normal position at the same time the actuator 1 is retracted. In this embodiment, if power to the cylinder 1 is lost, the bows 3 remain extended, which keeps the contents of the container 4 covered.

Although the illustrated embodiment teaches that when the actuator 1 extends it moves the bow 3 toward the sidewall of the container 4, the invention is not so limited. One skilled in the art would easily recognize that the reverse could be true. In other words, the actuator 1 and torsion spring 7 could be combined such that when the actuator 1 retracts it moves the bow 3 toward the sidewall of the container 4.

Figure 4:
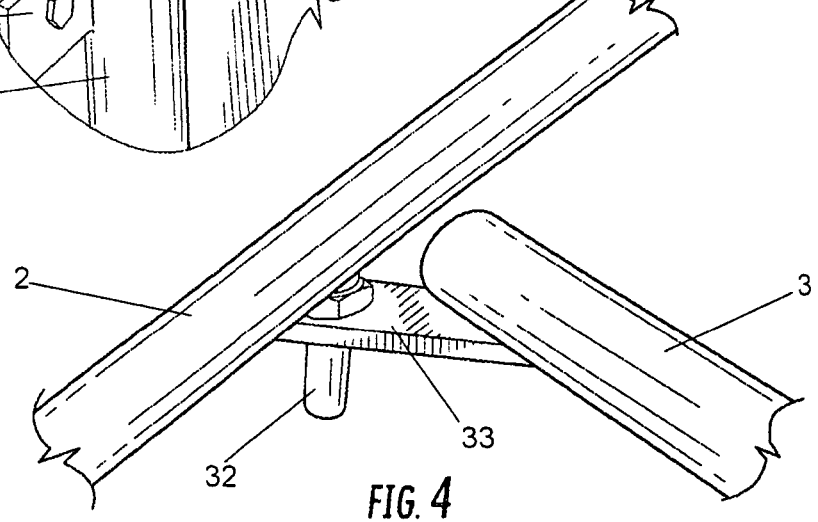
FIG. 4 is an enlarged view of the bow and crossbar connection of the tarp support system.

FIG. 4 generally illustrates the pivoting connection between the bow 3 and cross bar 2. The bow 3 and crossbar 2 are combined by a member 33. Fasteners 32 are used to combine the bow 3 and the crossbar 2 to the member 33. One skilled in the art would recognize the particular type of fastener 32 used is not important, so long as the joint between the bow 3 and crossbar 2 can pivot, such that the bow 3 and crossbar 2 can rotate between an extended and retracted position.

Figure 5:
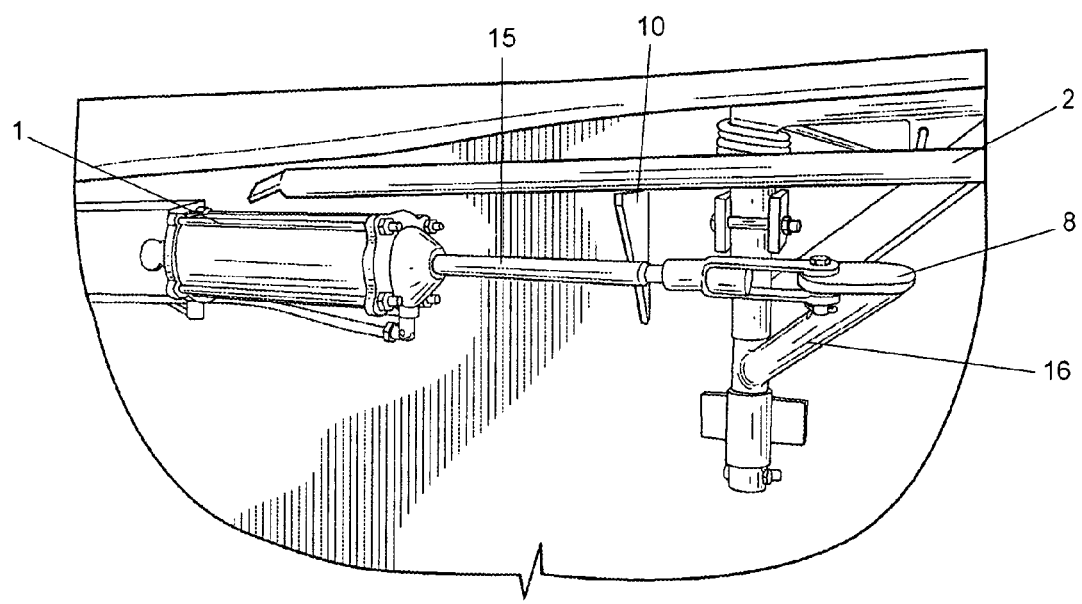
FIG. 5 is an enlarged view of an embodiment of the positioning device used in the tarp support system.

FIG. 5 illustrates the actuator 1; however, the actuator may be replaced with a manually operated positioning device 1, such as a cable or rope (not shown) attached to a bow and extending outside the container 4. The operator may then pull the rope which in turn rotates the bows 3 outward to the retracted position. The operator can lock or tie the rope to hold the bows 3 in the retracted position.

Returning to FIG. 5, the actuator 1 is a pneumatic cylinder 1 mounted on the inner sidewall of the container 4. The pneumatic cylinder 1 is operated by a switch (not shown) either mounted on the outside of container 4 or operated from inside the cab of the truck. When the operator activates the switch to the pneumatic cylinder 1, its piston 15 moves between an extended and a retracted position. A single switch extends and retracts all the cylinders 1 in the tarp support system 100. In some embodiments, multiple cylinders 1 are used on each side of the tarp support system 100 to add power, increase the speed, or reduce the stress on the cylinders 1.

In FIG. 5 the cylinder 1 is in the extended position and the bows 3 and the crossbar 2 are in a retracted position generally parallel with the side of the container 4. The piston 15 of the cylinder 1 is attached to the bow 3 by a linking member 8 attached to a pivot bar 16. The pivot bar 16 is combined with the hinge 5. This allows the fixed cylinder 1 to rotate the bow 3 between an extended and retracted position. Also, a support bracket 10 is mounted to the side of the container 4. The support bracket 10 supports the end of the crossbar 2 when it is in the retracted position.

Figure 6:
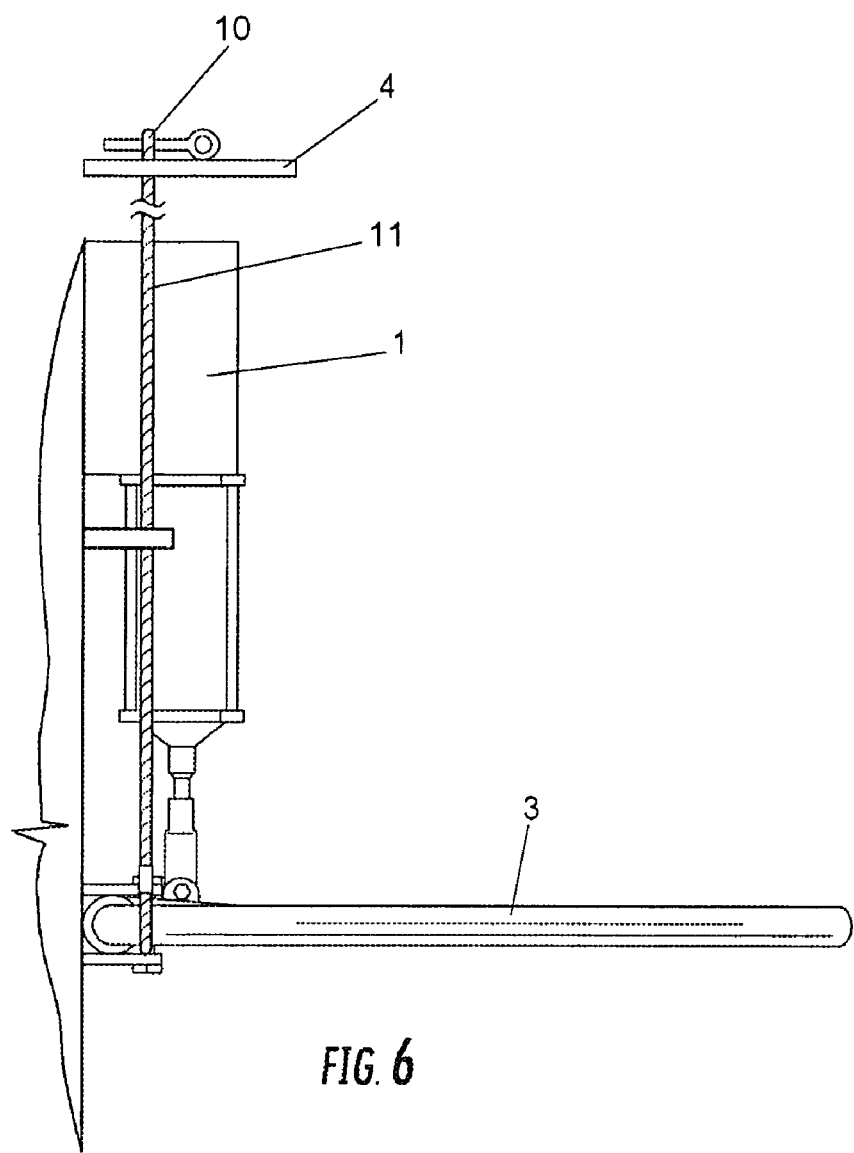
FIG. 6 is a top view showing an embodiment of a safety lock used in the tarp support system.
Figure 7:
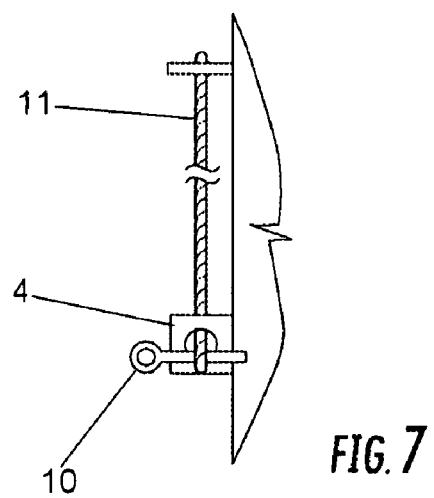
FIG. 7 is an end view of the safety lock of FIG. 6.

An additional embodiment includes a safety mechanism to prevent the bows 3 from retracting unintentionally. If the bows retract unintentionally the contents of the container 4 may be exposed to the elements and potentially cause extensive economic damage. Various embodiments of the safety mechanism are illustrated in FIGS. 6-11. Referring to FIGS. 6-7, a cable 11 is combined with a bow 3 and extends through a hole to the outside wall of the container 4. A pin 10 fixes the cable 11 in place to prevent the bows 3 from moving to the retracted position. The operator can remove the pin 10 to unlock the bow 3 before operating the cylinder 1.

Figure 8:
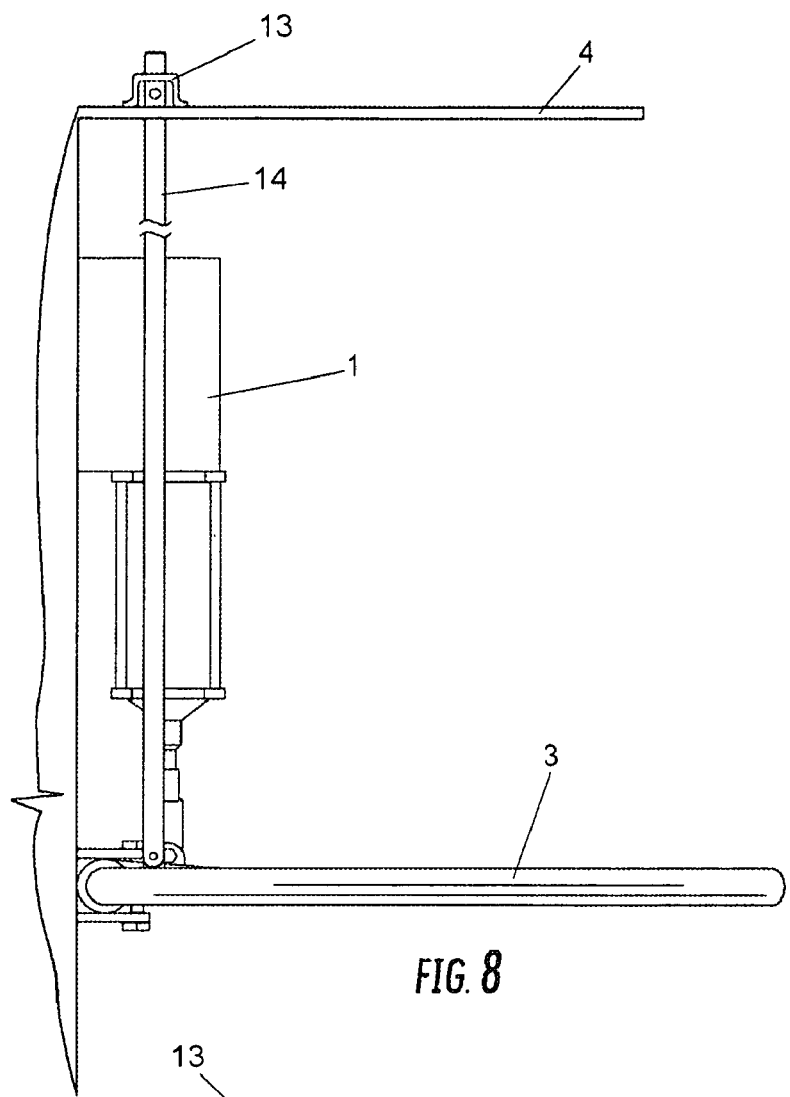
FIG. 8 is a top view showing another embodiment of a safety lock.
Figure 9:
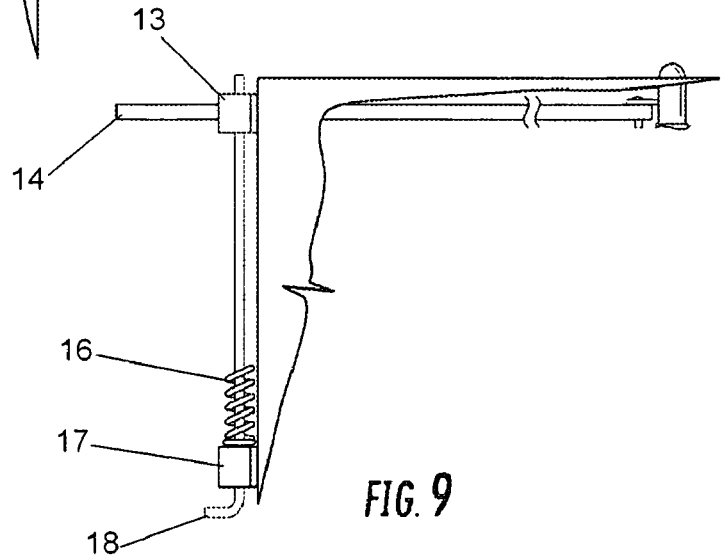
FIG. 9 is an end view of the safety lock of FIG. 8.

In an alternate embodiment, shown in FIGS. 8-9, a bar 14 is combined with a bow 3 and extends through a hole to the outside of the container 4. A locking pin 18 accessible from the outside of the container 4, extends upward to selectively hold the bar 14. When the operator unlocks the bar 14 the bow 3 is free to retract. A spring 16 and support member 17 bias the locking pin 18 back into the locked position.

Figure 10:
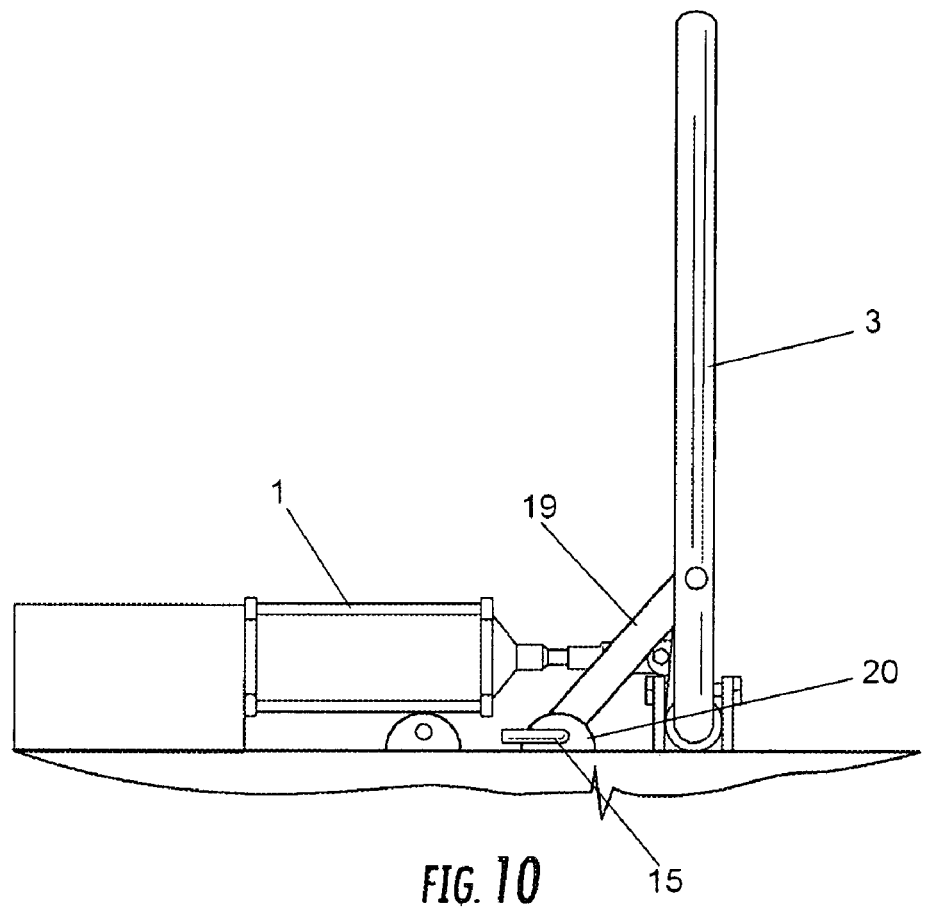
FIG. 10 is a top view showing yet another embodiment of a safety lock.
Figure 11:
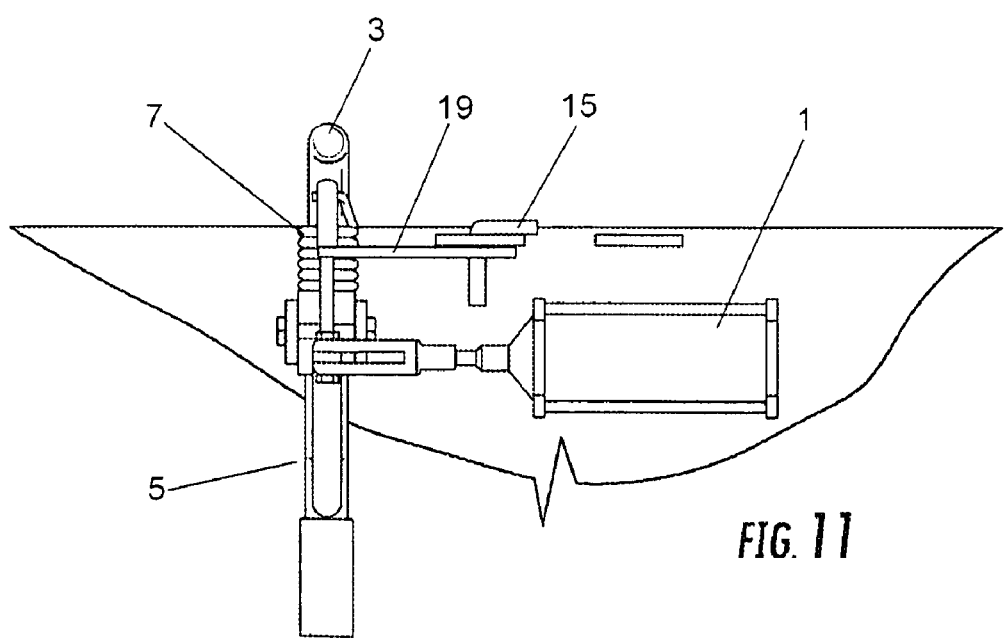
FIG. 11 is an end view of the safety lock of FIG. 10.

In yet another embodiment of the locking mechanism, illustrated in FIGS. 10-11, a cross bar 19 extends from the bow 3 to the sidewall of the container 4. A pin 15 attaches the crossbar 19 to a protrusion 20 fixed to the side of the container 4. Alternatively the pin 15 could be accessible from the outside of the container 4 by merely repositioning the orientation of the pin 15 and protrusion 20. When the pin 15 is removed, the crossbar 19 is unlocked and the bows 3 are free to rotate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. An apparatus for providing support for a covering over a container, the apparatus comprising:
    a plurality of swinging bows combined with the container, wherein in the extended position said bows extend inwardly over the top of the container and in the retracted position the bows move outwardly to expose the open top;
    a crossbar pivotally combined with at least two of said bows, said combined bows simultaneously move between an extended and a retracted position;
    a biasing member to bias said bows in the extended position; and
    a positioning device combined with at least one of said combined bows to move the bows between the extended and retracted position.

2. The apparatus of claim 1, wherein said positioning device is an actuator.

3. The apparatus of claim 2, wherein said actuator is an pneumatic cylinder operable from the outside of said container to provide automated extension and retraction of said bows.

4. The apparatus of claim 2, wherein said actuator is an electric actuator operable from the outside of said container to provide automated extension and retraction of said bows.

5. The apparatus of claim 1, wherein said actuator is a hydraulic cylinder operable from the outside of said container to provide automated extension and retraction of said bows.

6. The apparatus of claim 1, comprising a locking device to hold said bows in the extended position.

7. The apparatus of claim 6, wherein said locking device is a cable extending from one of said bows to the outside of the container and being selectively pinned against the sidewall of the container.

8. The apparatus of claim 6, wherein said locking device is a bar extending from one of said bows to the outside of the container and being selectively pinned against the sidewall of the container.

9. The apparatus of claim 6, wherein said locking device is a cross bar extending from one of said bows angularly toward the inner sidewall of the container and being selectively pinned against the sidewall of the container.

10. An apparatus for providing support for a covering over a container, the apparatus comprising:
   a first and second set of plurality of bows pivotally combined to the sides of the container, wherein said first set of plurality of bows is combined on a first side of the container and said second set of plurality of bows is combined on the side of the container opposite the first side, and wherein said bows move between an inwardly extended position and an outwardly position near the sides of the container;
   first and second crossbars joining said respective first and second sets of plurality of bows; and
   first and second actuators combined with at least one bow in the respective first and second set of plurality of bows.

11. The apparatus of claim 10 comprising a plurality of torsion springs combined with said first and second plurality of bows to bias said bows in the inwardly extended position.

12. The apparatus of claim 10 comprising a locking device to hold the bows in the inwardly extended position.

13. The apparatus of claim 10 wherein the actuators are pneumatic cylinders.

14. The apparatus of claim 10 wherein the actuators are electric actuators.

15. An apparatus for providing support for a covering over a container, the apparatus comprising:
   a first and second set of plurality of bows pivotally combined to the sides of the container, wherein said first set of plurality of bows is combined on one side of the container and said second set of plurality of bows is combined on the other side of the container, and wherein said bows move between an inwardly extended position and a position near the side of the container;
   a first and second crossbar joining said respective first and second sets of plurality of bows;
   a first and second actuator combined with at least one bow in the respective first and second set of plurality of bows; and
   a plurality of torsion springs combined with said plurality of bows to bias said bows in the inwardly extended position.

16. The apparatus of claim 15 wherein the actuators are pneumatic cylinders.

17. The apparatus of claim 15 wherein the actuators are electric actuators.

18. The apparatus of claim 15 comprising a locking device to hold the bows in the inwardly extended position.

19. The apparatus of claim 18 wherein the locking device includes a selectively removable member combined between at least one bow and the container.

* * * * *